US009539557B2

(12) United States Patent
Diebold et al.

(10) Patent No.: US 9,539,557 B2
(45) Date of Patent: *Jan. 10, 2017

(54) TREATED INORGANIC PIGMENTS HAVING IMPROVED DISPERSABILITY AND USE THEREOF IN COATING COMPOSITIONS

(71) Applicant: CHEMOURS COMPANY TT LLC, Harrisburg, PA (US)

(72) Inventors: Michael Patrick Diebold, Wilimington, DE (US); Daniel C Kraiter, Wilmington, DE (US); Eric Rusnak, Dickson, TN (US); Agingu Shih, New Taipei (TW)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/354,378

(22) PCT Filed: Oct. 11, 2012

(86) PCT No.: PCT/US2012/059767
§ 371 (c)(1),
(2) Date: Apr. 25, 2014

(87) PCT Pub. No.: WO2013/062781
PCT Pub. Date: May 2, 2013

(65) Prior Publication Data
US 2014/0343212 A1 Nov. 20, 2014

Related U.S. Application Data

(60) Provisional application No. 61/552,709, filed on Oct. 28, 2011.

(51) Int. Cl.
C04B 26/06 (2006.01)
B01J 13/02 (2006.01)
C09C 1/36 (2006.01)
C09C 3/06 (2006.01)
C09C 1/02 (2006.01)
B82Y 30/00 (2011.01)
B01J 13/22 (2006.01)
C08K 3/00 (2006.01)
C09D 7/12 (2006.01)

(52) U.S. Cl.
CPC ............. B01J 13/025 (2013.01); B01J 13/22 (2013.01); B82Y 30/00 (2013.01); C08K 3/0083 (2013.01); C09C 1/027 (2013.01); C09C 1/3661 (2013.01); C09C 3/063 (2013.01); C09D 7/1216 (2013.01); C01P 2004/62 (2013.01); C01P 2004/64 (2013.01); C01P 2004/84 (2013.01); C01P 2006/60 (2013.01)

(58) Field of Classification Search
CPC ... C09C 1/3661; C08K 3/0083; C09D 7/1216; B01J 13/025; B01J 13/22

USPC .......... 524/433; 427/213.3, 213.31
See application file for complete search history.

(56) References Cited

U.S. PATENT DOCUMENTS

| | | | |
|---|---|---|---|
| 3,035,966 A | 5/1962 | Siuta | |
| 3,409,501 A | 11/1968 | Siuta | |
| 3,437,502 A | 4/1969 | Werner | |
| 3,506,466 A | 4/1970 | Bramekamp et al. | |
| RE27,818 E | 11/1973 | Werner | |
| 4,075,031 A | 2/1978 | Allen | |
| 4,125,412 A | 11/1978 | West | |
| RE30,233 E | 3/1980 | Lane et al. | |
| 4,239,548 A | 12/1980 | Barnard et al. | |
| 4,599,124 A | 7/1986 | Kelly et al. | |
| 4,689,102 A | 8/1987 | Prawdzik et al. | |
| 5,425,986 A | 6/1995 | Guyette | |
| 5,464,887 A * | 11/1995 | Scott et al. ................... | 204/500 |
| 5,562,764 A | 10/1996 | Gonzalez | |
| 5,679,219 A | 10/1997 | Harms et al. | |
| 5,696,109 A | 12/1997 | Malfroy-Camine et al. | |
| 5,753,025 A | 5/1998 | Bettler et al. | |
| 5,992,120 A | 11/1999 | Meguro et al. | |

(Continued)

FOREIGN PATENT DOCUMENTS

| | | | |
|---|---|---|---|
| CA | 2765470 A1 | 12/2010 | |
| EP | 0081155 A1 | 6/1983 | |

(Continued)

OTHER PUBLICATIONS

"The Pigment Handbook", vol. 1, 2nd Ed., John Wiley & Sons, NY (1988) (Book not included).
International Search Report, PCT/US2012/034750, Dated June 26, 2012.
Outlines of Paint Technology (Halstead Press, Newyork NY, Third Edition, 1990) and Surface Coatings Vol. 1, Raw Materials and Their Usage (Chapman and Hall, Newyork , NY, Second Edition 1984 (Book Not Included).
Powders and Bulk Solids: Behavior, Characterization, Storage and Flow, by Dietmar Schulze, 2007 (Book Not Included).

(Continued)

Primary Examiner — Hannah Pak

(57) ABSTRACT

The disclosure provides a coating composition comprising a treated inorganic core particle, having improved dispersability, prepared by a process comprising: heating a slurry comprising porous silica treated inorganic core particle and water at a temperature of at least about 90° C., more typically about 93 to about 97° C., still more typically about 95 to about 97° C.; and adding a soluble alumina source to the slurry while maintaining the pH at about 8.0 to 9.5 to form an alumina treatment on the porous silica treated inorganic core particle; wherein the treated inorganic core particle does not comprise dense silica or alumina treatments, and has silica present in the amount of about 7% to about 14% and alumina present in the amount of about 4.0% to about 8.0%; and wherein the particle to particle surface treatments are substantially homogeneous.

18 Claims, No Drawings

(56) References Cited

U.S. PATENT DOCUMENTS

| | | | |
|---|---|---|---|
| 5,993,533 A * | 11/1999 | Diebold et al. | 106/442 |
| 6,287,681 B1 | 9/2001 | Mehta et al. | |
| 6,290,815 B1 | 9/2001 | Magnin et al. | |
| 6,323,252 B1 | 11/2001 | Gartner et al. | |
| 6,413,618 B1 | 7/2002 | Parker et al. | |
| 6,551,455 B2 | 4/2003 | Johnson et al. | |
| 6,599,592 B1 | 7/2003 | Schulz | |
| 6,706,372 B2 | 3/2004 | Schulz et al. | |
| 6,709,764 B1 | 3/2004 | Perrin et al. | |
| 6,761,979 B2 | 7/2004 | Yokochi et al. | |
| 6,783,586 B2 | 8/2004 | Bettler et al. | |
| 6,783,631 B2 | 8/2004 | Schulz | |
| 7,029,648 B2 | 4/2006 | Subramanian et al. | |
| 7,601,780 B2 | 10/2009 | Bell et al. | |
| 8,623,507 B2 | 1/2014 | Bell et al. | |
| 9,120,074 B2 * | 9/2015 | Diebold | C09C 1/3661 |
| 2002/0017221 A1 | 2/2002 | Hiew et al. | |
| 2003/0138600 A1 | 7/2003 | Dohring et al. | |
| 2007/0028806 A1* | 2/2007 | Piro et al. | 106/446 |
| 2014/0338852 A1* | 11/2014 | Diebold | 162/164.6 |
| 2014/0342087 A1* | 11/2014 | Diebold et al. | 427/213.31 |

FOREIGN PATENT DOCUMENTS

| | | |
|---|---|---|
| EP | 0245984 A1 | 11/1987 |
| EP | 1760116 A1 | 7/2007 |
| EP | 2067747 A1 | 10/2009 |
| JP | 2194065 A | 7/1990 |
| WO | 93/11286 A1 | 6/1993 |
| WO | 9640149 A1 | 12/1996 |
| WO | 03/037995 A1 | 5/2003 |
| WO | 2012/121801 A1 | 9/2012 |
| WO | 2012/148877 A1 | 11/2012 |

OTHER PUBLICATIONS

Johanson, Jr Johanson Inc., Flow Indices in the Prediction of Powder Behavior, Pharmaceutical Manufacturing Intl, 1995, Published by Sterling Publications Ltd.

Priebe et al., The Ceramic Waste Form Process At the Idaho National Laboratory, August 2006, p. 14 of 16.

Nternational Search Report, PCT/US2012/034769, Dated June 29, 2012.

Nternational Search Report, PCT/US2012/034793, Dated July 11, 2012.

Nternational Search Report, PCT/US2012/034523, Dated Sept. 16, 2013.

Nternational Search Report, PCT/US2012/034519, Dated Sept. 16, 2013.

Nternational Search Report, PCT/US2012/059760, Dated Jan. 18, 2013.

Nternational Search Report, PCT/US2012/059767, Dated Jan. 18, 2013.

Nternational Search Report, PCT/US2012/059773, Dated Jan. 18, 2013.

Pigment Handbook, T. C. Patton, Ed., Riley-Interscience, New York, 1973. Book not included.

C.R.Martens "Emulsion and Water-Soluble Paints and Coatings", (Reinhold Publishing Corporation, New Your, NY, 1965) Book not included.

* cited by examiner

TREATED INORGANIC PIGMENTS HAVING IMPROVED DISPERSABILITY AND USE THEREOF IN COATING COMPOSITIONS

BACKGROUND OF THE DISCLOSURE

Field of the Disclosure

The present disclosure relates to a process for preparing treated inorganic core particles, and in particular to the preparation of treated titanium dioxide particles, having improved dispersability; a process for their preparation; and their use in coating compositions.

Description of the Related Art

Coating compositions of interest in the present disclosure are water-dispersible coating compositions such as latex coating compositions, e.g. acrylic, styrene acrylic, vinyl acetate, ethylene vinyl acetate, polyurethane, alkyd dispersion etc; and solvent based such as alkyd coating compositions; urethane coating compositions; and unsaturated polyester coating compositions, acrylic, styrene-acrylic compositions typically a paint, clear coating, or stain. These coatings may be applied to a substrate by spraying, applying with a brush or roller or electrostatically, such as pigment coatings, etc. These coating compositions are described in *Outlines of Paint Technology* (Halstead Press, New York, N.Y., Third edition, 1990) and *Surface Coatings Vol. I, Raw Materials and Their Usage* (Chapman and Hall, New York, N.Y., Second Edition, 1984).

Inorganic particles may be added to the coating compositions. In particular, titanium dioxide particles have been added to coating compositions for imparting whiteness and/or opacity to the finished article. However, the flat grade pigments used in some coating compositions have poor dispersability and are difficult to handle.

A need exists for treated inorganic core particles, such as treated titanium dioxide particles, that have improved dispersability and that are easier to handle in use.

SUMMARY OF THE DISCLOSURE

In a first aspect, the disclosure provides a coating composition comprising a treated inorganic core particle, in particular treated titanium dioxide ($TiO_2$) particle, having improved dispersability, prepared by a process comprising:
(a) heating a slurry comprising porous silica treated inorganic core particle and water at a temperature of at least about 90° C., more typically about 93 to about 97° C., still more typically about 95 to about 97° C.; and
(b) adding a soluble alumina source to the slurry from step (a) while maintaining the pH at about 8.0 to 9.5 to form an alumina treatment on the porous silica treated inorganic core particle; wherein the treated inorganic core particle does not comprise dense silica or alumina treatments, and has silica present in the amount of about 7% to about 14% and alumina present in the amount of about 4.0% to about 8.0%; and wherein the particle to particle surface treatments are substantially homogeneous.

In the first aspect, the treated inorganic core particle, in particular treated titanium dioxide ($TiO_2$) particle, is completely dispersed in the water to formic a slurry in less than 10 minutes.

By "homogeneous" we mean that each core particle has attached to its surface an amount of alumina and silica such that the variability in treatment levels among particles is so low as to make all particles interact with water, organic solvent or dispersant molecules in the same manner (that is, all particles interact with their chemical environment in a common manner and to a common extent).

By "completely dispersed" we mean that all agglomerates formed in the wet-treatment and/or drying processes have been reduced to individual particles or small groups of particles (aggregates) that are created during the particle formation stage in pigment manufacture.

In the first aspect, the silica is applied by deposition of pyrogenic silica onto pyrogenic inorganic core particle, in particular pyrogenic titanium dioxide ($TiO_2$) particle, or by co-oxygenation of silicon tetrachloride with titanium tetrachloride, or by deposition via condensed phase aqueous oxide precipitation onto the inorganic core particle, in particular titanium dioxide ($TiO_2$) particle, as described below.

In the first aspect, the disclosure provides the slurry comprising silica treated inorganic core particle, in particular treated titanium dioxide ($TiO_2$) particle, and water prepared by a process comprising:
(a1)) providing a slurry of an inorganic core particle in water;
(a2) heating the slurry to about 30 to about 40° C., more typically 33-37° C. and adjusting the pH to about 3.5 to about 7.5;
(a3) adding a soluble silicate solution to the slurry while maintaining the pH between about 3.5 and about 7.5; and
(a4) stirring for at least about 5 mins, In the first aspect, the coating composition further comprises a resin.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content clearly dictates otherwise. Thus, for example, reference to "$TiO_2$ particle", "the $TiO_2$ particle", or "a $TiO_2$ particle" also includes a plurality of $TiO_2$ particles.

This disclosure relates to an inorganic core particle, typically inorganic metal oxide or mixed metal oxide pigment particles, more typically a titanium dioxide particle that may be a pigment or a nanoparticle, wherein the inorganic core particles, typically inorganic metal oxide or mixed metal oxide particles, more typically titanium dioxide particles have improved dispersability. These treated inorganic core particles, typically a titanium dioxide particles, having improved disperability are useful in the preparation of paper slurries or coating compositions that can be used as a paint or an ink. The paper slurries may be used to make paper laminates that are useful as flooring, furniture, countertops, artificial wood surfaces, and artificial stone surfaces.

Inorganic Core Particle:

It is contemplated that any inorganic core particle, and in particular titanium dioxide particles are treated as per this disclosure. By inorganic core particle it is meant an inorganic particulate material that becomes dispersed throughout a final product such as a polymer melt or coating or laminate composition and imparts color and opacity to it. The inorganic core particle may be oxides of titanium, aluminum, zinc, copper, iron; the sulfates of calcium, strontium, barium; zinc sulfide; copper sulfide, zeolites; mica; talc; kaolin, mullite, calcium carbonate, or silica, Lead or mercury compound are contemplated equivalent core materials but may be undesirable due to their toxicity. More typical core materials are titanium dioxide, $TiO_2$ and barium sulfate, and most typically titanium dioxide, $TiO_2$.

In particular, titanium dioxide is an especially useful particle in the processes and products of this disclosure. Titanium dioxide ($TiO_2$) particles useful in the present disclosure may be in the rutile or anatase crystalline form. They are commonly made by either a chloride process or a sulfate process. in the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference. The particle may be a pigment or nanoparticle.

By "pigment" it is meant that the titanium dioxide particles have an average size of less than 1 micron. Typically, the particles have an average size of from about 0.020 to about 0.95 microns, more typically, about 0.050 to about 0.75 microns and most typically about 0.075 to about 0.50 microns. By "nanoparticle" it is meant that the primary titanium dioxide particles typically have an average particle size diameter of less than about 100 nanometers (nm) as determined by dynamic light scattering that measures the particle size distribution of particles in liquid suspension. The particles are typically agglomerates that may range from about 3 nm to about 6000 nm.

Process for Preparing Treated Titanium Dioxide Particles

The process for preparing a treated inorganic core particle, in particular a treated titanium dioxide ($TiO_2$) particle, having improved dispersability comprises heating a slurry comprising porous silica treated inorganic core particle and water at a temperature of at least about 90° C., more typically about 93 to about 97° C., still more typically about 95 to about 97° C. The silica application is by deposition of pyrogenic silica onto pyrogenic inorganic core particle, in particular pyrogenic titanium dioxide ($TiO_2$) particle, or by co-oxygenation of silicon tetrachloride with titanium tetrachloride, or by deposition via condensed phase aqueous oxide.

In one embodiment, the slurry comprising silica treated inorganic core particle, in particular treated titanium dioxide ($TiO_2$) particle, and water is prepared by a process comprising the following steps that include providing a slurry of inorganic core particle in water; wherein typically $TiO_2$ is present in the amount of 25 about 35% by weight, more typically about 30% by weight, based on the total weight of the slurry. This is followed by heating the slurry to about 30 to about 40° C., more typically 33-37° C., and adjusting the pH to about 3.5 to about 7.5, more typically about 5.0 to about 6.5. Soluble silicates such as sodium or potassium silicate are then added to the slurry while maintaining the pH between about 3.5 and about 7.5, more typically about 5.0 to about 6.5; followed by stirring for at least about 5 mins and typically at least about 10 minutes, but no more than 15 minutes, to facilitate precipitation onto the inorganic core particle, in particular titanium dioxide ($TiO_2$) particle. Commercially available water soluble sodium silicates with $SiO_2/Na_2O$ weight ratios from about 1.6 to about 3.75 and varying from 32 to 54% by weight of solids, with or without further dilution are the most practical. To apply a porous silica to the inorganic core particle, the slurry should typically be acidic during the addition of the effective portion of the soluble silicate. The acid used may be any acid, such as HCl, $H_2SO_4$, $HNO_3$ or $H_3PO_4$ having a dissociation constant sufficiently high to precipitate silica and used in an amount sufficient to maintain an acid condition in the slurry. Compounds such as $TiOSO_4$ or $TiCl_4$ which hydrolyze to form acid may also be used. Alternative to adding all the acid first, the soluble silicate and the acid may be added simultaneously so long as the acidity of the slurry is typically maintained at a pH of below about 7.5. After addition of the acid, the slurry should be maintained at a temperature of no greater than 50° C. for at least 30 minutes before proceeding with further additions.

The treatment corresponds to about 7 to about 14% by weight of silica, more typically about 9.5 to about 12.0%, based on the total weight of the inorganic core particle, and in particular the titanium dioxide core particle. Control of the isoelectric point between 5.0 and 7.0 can be beneficial in facilitating the dispersion and/or flocculation of the particulate compositions during plant processing and in their end use applications.

An alternate method of adding a silica treatment to the $TiO_2$ particle is by deposition of pyrogenic silica onto pyrogenic inorganic core particle, in particular pyrogenic titanium dioxide ($TiO_2$) particle, as described in U.S. Pat. No. 5,992,120, or by co-oxygenation of silicon tetrachloride with titanium tetrachloride, as described in U.S. Pat. Nos. 5,562,764, and 7,029,648 which are incorporated herein by reference.

The slurry comprising porous silica treated inorganic core particles and water is heated at a temperature of at least about 90° C., more typically about 93 to about 97° C., still more typically about 95 to about 97° C. The second treatment comprises precipitated aluminum oxide or alumina. This treatment is porous, and is typically applied from a solution of soluble alumina source, such as a soluble aluminate, using techniques known to one skilled in the art. In a specific embodiment, a soluble alumina source, such as a soluble aluminate, is added to the slurry comprising silica treated titanium dioxide while maintaining the pH at about 7.0 to 10.0, more typically 8.5 to about 9.5 to form an alumina treatment on the porous silica treated inorganic core particle. By "soluble alumina source" is meant alkali metal salts of aluminate anions, for example, sodium or potassium aluminate. Alternatively, the soluble alumina source may be acidic, such as for example aluminum chloride, in which case the pH is controlled using a base rather than an acid. The treated inorganic core particle does not comprise dense silica or alumina treatments.

The porous alumina treatment is present in the amount of about 4.0% to about 8.0%; more typically about 5.0% to about 7.5%, based on the total weight of the inorganic core particle, and in particular the titanium dioxide core particle.

Because substantially all of the alumina that is precipitated finds its way to a treatment on the inorganic core particles, it typically is only necessary to provide that amount of soluble alumina source, such as a soluble aluminate, to the slurry liquid which will result, after precipitation, in the appropriate degree of treatment.

Typically, the particle to particle surface treatments are substantially homogenous. By this we mean that each core particle has attached to its surface an amount of alumina and silica such that the variability in alumina and silica levels among particles is so low as to make all particles interact with water, organic solvent or dispersant molecules in the same manner (that is, all particles interact with their chemical environment in a common manner and to a common extent). Typically, the treated inorganic core particle, in particular treated titanium dioxide ($TiO_2$) particle, is completely dispersed in the water to form a slurry in less than 10 minutes, more typically less than about 5 minutes. By "completely dispersed" we mean that the dispersion is composed of individual particles or small groups of particles created during the particle formation stage (hard aggregates) and that all soft agglomerates have been reduced to individual particles.

After treatment according to this process the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase. The process provides a method for easily and efficiently obtaining a high solids water slurry of completely dispersed particles.

While the disclosure is not intended to be bound by a theory of operation, it is believed that the improved dispersability of the porous treated $TiO_2$ pigments of the disclosure is due to the nature of the treatments and application thereof.

Applications

The treated inorganic core particles, typically inorganic metal oxide or mixed metal oxide particles, more typically titanium dioxide, may be used in coating compositions such as paints, plastic parts such as shaped articles or films, or paper laminates. The paper laminates of this disclosure are useful as flooring, furniture, countertops, artificial wood surface, and artificial stone surface.

Coating Compositions:

This disclosure is particularly suitable for producing coating compositions, and in particular architectural paint formulations or ink formulations.

Coating compositions prepared from colorant and the treated inorganic particles, particularly treated $TiO_2$ pigment containing coating bases have improved paint or ink performance.

Coating Base:

The coating base comprises a dispersion of resin and colorants of this disclosure. Other additives known to one skilled in the art may also be present.

Resin:

The resin is selected from the group consisting of water-dispersible coating compositions such as latex coating compositions; alkyd coating compositions; urethane coating compositions; and unsaturated polyester coating compositions; and mixture thereof. By "water-dispersible coatings" as used herein is meant surface coatings intended for the decoration or protection of a substrate, comprising essentially an emulsion, latex, or a suspension of a film-forming material dispersed in an aqueous phase, and typically comprising surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints. For latex paints the film forming material is a latex polymer of acrylic, styrene-acrylic, vinyl-acrylic, ethylene-vinyl acetate, vinyl acetate, alkyd, vinyl chloride, styrene-butadiene, vinyl versatate, vinyl acetate-maleate, or a mixture thereof. Such water-dispersed coating compositions are described by C. R. Martens in "Emulsion and Water-Soluble Paints and Coatings" (Reinhold Publishing Corporation, New York, N.Y., 1965), Tex-Cote® and Super-Cote®, Rhopelx®, Vinnapas® EF500 are further examples of water based coating compositions comprising 100% acrylic resin.

The alkyd resins may be complex branched and cross-linked polyesters having unsaturated aliphatic acid residues. Urethane resins typically comprise the reaction product of a polyisocyanate, usually toluene diisocyanate, and a polyhydric alcohol ester of drying oil acids.

The resin is present in the amount of about 5 to about 40% by weight based on the total weight of the coating composition. The amount of resin is varied depending on the amount of sheen finish desired.

Colorant:

The treated inorganic core particles, particularly the treated titanium dioxide particles described earlier may be used alone or in combination with conventional colorants. Any conventional colorant such as a pigment, dye or a dispersed dye may be used in this disclosure to impart color to the coating composition. In one embodiment, generally, about 0.1% to about 40% by weight of conventional pigments, based on the total weight of the component solids, can be added. More typically, about 0.1% to about 25% by weight of conventional pigments, based on the total weight of component solids, can be added.

The pigment component of this disclosure may be any of the generally well-known pigments or mixtures thereof used in coating formulations, as reported, e.g., in Pigment Handbook, T. C. Patton, Ed., Wiley-Interscience, New York, 1973, Any of the conventional pigments used in coating compositions can be utilized in these compositions such as the following: metallic oxides, such as titanium dioxide, zinc oxide, and iron oxide, metal hydroxide, metal flakes, such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired chromate-free pigments, such as barium metaborate, zinc phosphate, aluminum triphosphate and mixtures thereof, can also be used.

Other Additives

A wide variety of additives may be present in the coating compositions of this disclosure as necessary, desirable or conventional. These compositions can further comprise various conventional paint additives, such as dispersing aids, anti-settling aids, wetting aids, thickening agents, extenders, plasticizers, stabilizers, light stabilizers, antifoams, defoamers, catalysts, texture-improving agents and/or antiflocculating agents. Conventional paint additives are well known and are described, for example, in "C-209 Additives for Paints" by George Innes, February 1998, the disclosure of which is incorporated herein by reference. The amounts of such additives are routinely optimized by the ordinary skilled artisan so as to achieve desired properties in the wall paint, such as thickness, texture, handling, and fluidity.

Coating compositions of the present disclosure may comprise various rheology modifiers or rheology additives (such as Acrysol(®), wetting agents, dispersants and/or co-dispersants, and microbicides and/or fungicides. To achieve enhanced weatherability, the present coating compositions may further comprise UV (ultra-violet) absorbers such as Tinuvin®.

Coating compositions of the present disclosure may further comprise ceramic or elastomeric substances, which are heat and/or infrared reflective, so as to provide additional heat reflective benefits.

Preparation of the Coating Composition and its Use:

The present disclosure provides a process for preparing a coating composition, such as a paint formulation, comprising mixing the colorant comprising the treated inorganic core particles and optionally conventional pigments with the resin to form a coating base. Optionally a vehicle may be present. The vehicle may be aqueous or solvent based. Typically these coating compositions may comprise from about 30 to about 55% solids by weight and typically about 25% to about 45% solids by volume, Typically the coating compositions of this disclosure have a density of about 9.1 to about 11.9 pounds per gallon, more typically about 9.5 to about 10.8 pounds per gallon. Any mixing means known to one skilled in the art may be used to accomplish this mixing. An example of a mixing device includes a high speed Dispermat®, supplied by BYK-Gardner, Columbia, Md.

Coating compositions of the present disclosure may be applied by any means known to one skilled in the art, for example, by brush, roller, commercial grade airless sprayers, or electrostatically in a particle coating. Coating compositions presented herein may be applied as many times necessary so as to achieve sufficient coating on the coated surface, for example, an exterior wall. Typically, these coating compositions may be applied from about 2 mils to about 10 mils wet film thickness, which is equivalent to from about 1 to about 5 dry mils film thickness.

Coating compositions presented herein may be applied directly to surfaces or applied after surfaces are first coated with primers as known to one skilled in the art.

The coating compositions of this disclosure may be a paint, and the paint may be applied to a surface selected from the group consisting of building material, automobile part, sporting good, tenting fabric, tarpaulin, geo membrane, stadium seating, lawn furniture and roofing material.

The examples which follow, description of illustrative and typical embodiments of the present disclosure are not intended to limit the scope of the disclosure. Various modifications, alternative constructions and equivalents may be employed without departing from the true spirit and scope of the appended claims. In one embodiment, the coating films may be substantially free of other conventional colorants and contain solely the treated titanium dioxide pigments of this disclosure.

TEST METHODS

There are many aspects of pigment characteristics that affect various properties of coatings or paints. The pigments described herein are noteworthy for their positive effect on the ease with which the pigment can be processed into a water slurry, and the extent to which the pigment scatters visible light, as evidenced by increased tinting strength and hiding power (spread rate).

Ease of Slurry Make-up: In latex paint production it is generally desireable to prepare a high solids water slurry of a $TiO_2$ pigment that can then be mixed or otherwise incorporated into a slurry containing the other paint ingredients. Typically this $TiO_2$ pigment slurry is made in a separate dispersion step with equipment specifically designed to disperse sub-micron particles (for example, a Hockmeyer disperser, a Katy mill, or a Dispermat disperser). For sample evaluation, a slurry of each pigment example was made on a Hockmeyer dispersor with the following amounts of ingredients:

3000 g $TiO_2$ pigment
1953 g Water
0.9 g TKPP (potassium tripolyphosphate) dispersant
0.5 g Proxel® (a biocide)

Slurry was made by adding the $TiO_2$ pigment incrementally, into a mixing pot that contains all of the water, TKPP and Proxel®, while being sheared at 1,000 rpm. Dispersibility (or ease of dispersion) was quantified by the time required to fully incorporate the entire mass of pigment into the slurry.

Tinting Strength: Tinting strength is a measure of the scattering ability of a white pigment. Since white pigments are added to a paint, plastic or paper laminate to scatter visible light, high tinting strength is desired. In this test a standard white paint of the $TiO_2$ of interest was made using a polymeric binder (trade name AC-347) and with a $TiO_2$ content of 26% PVC.

Diluted green tint (GW-951P) was made by combining 1 part tint with 2 parts de-ionized water. The green tint was added to the white paint at a level of 3 g tint per 100 g paint. At this level, measured Y values for the dried paint were close to 50%.

Each paint was drawn down on a uniformly white card using a 0.004 inch clearance blade and allowed to air dry. After drying, a second coat of the same paint was applied to a portion of the card using a paint brush, and the resulting wet paint is vigorously brushed to give a "brush out" section on the panel. Y color values were determined in triplicate for each drawdown, both for the undisturbed drawdown area and, separately, the brushed-out area. A drawdown was also made using paint made with a standard $TiO_2$ for the purpose of comparing the samples of interest to a known pigment.

K/S values were calculated for each drawdown area using the Tristimulus Y value as follows:

$$K/S = [(1-Y)^2]/[2*Y]$$

Tint Strength values were reported as the ratio of K/S values for the standard paint divided by the K/S values for the paint made with pigment of interest, and were reported as a percentage. Shear strength uniformity, which was a measure of pigment dispersion stability as the paint dries, was determined by comparing the KiS values of the undisturbed areas of the drawdown to the KIS values of the brushed out area.

Weighed Hiding (Spread Rate): Weighed hiding (spread rate) is a measure of the ability of a white pigment to obscure the surface appearance of a substrate. This was determined using contrast ratio and was based on the theory of dependent light scattering. Paints were made with different $TiO_2$ pigments as detailed in the Tinting Strength test description except that no colorant was added (that is, the paint was white). Spread rate was measured on these paints through a series of steps. First, the correct blade clearance was determined by drawing the paint of interest down over black and white cards using several different blades that have clearances between 0.0025 and 0.0035 mil. Contrast ratios for these draw downs were determined by taking the ratio of light (Tristimulus Y) reflected over the black area of the panel divided by the Y value measured over the white area of the panel. A draw down blade was then selected such that the contrast ratio was between 92 and 95.

Next, four charts were drawn down over black and white cards for each paint of interest and for a control paint. Draw down weights were immediately measured, from which the total amount of applied paint was determined. The painted cards were then allowed to air dry overnight. After this, an average Y value was calculated from four values measured from each part (black or white) of the card.

The contrast ratio of the paint was determined by dividing the reflectance value measured on the black portion of the card by the reflectance value measured over the white portion of the card. Contrast ratio and reflectance over black values were then entered into a computer program that uses Kebulka-Munk equations to predict the number of square feet that a gallon of the paint would cover at complete hiding (complete hiding was defined as when the contrast ratio exceeds 0.98). This number of square feet was referred to as the "spread rate" of the pigment. Higher spread rates are indicative of greater hiding power and are therefore preferred.

EXAMPLES

Example 1

2000 g of $TiO_2$ oxidation base was slurried in 4520 ml de-ionized water to provide a concentration of 400 g $TiO_2$/liter (30.7 wt % $TiO_2$). This slurry was heated to 35° C. and the pH was adjusted to 5.5. Sodium silicate solution (1210 grams) was added with enough HCl to maintain pH between 4 and 7. After curing (with mixing) for 5 minutes, the slurry was heated to 55° C. 695 grams of sodium aluminate were added with enough HCl to maintain pH at 7. The slurry was stirred for an additional 30 minutes, maintaining pH and temperature, then filtered, washed, dried and steam micronized. The resulting sample had a percent $SiO_2$ value of 14% and a percent alumina value of 7.6%.

Example 2

The procedure described in Example 1 was used except:
After the 5 minute silica cure, the slurry was heated to 95° C.
During and after the aluminate addition, the slurry pH was maintained at 9.0.

SAMPLE EVALUATION RESULTS

Ease of pigment incorporation was measured as detailed above. For Example 2 sample, time was less than 1 minute. Example 1 sample did not fully incorporate into the slurry at all, despite the introduction of an additional 9 grams of dispersant (TKPP) into the slurry under sheer conditions of 2,000 rpm, The advantages of the sample of this disclosure are therefore clearly seen.

The draw down tinting strength, the brush out tinting strength, and the shear strength uniformity of Example 1 were defined as 100. The draw down tinting strength, the brush out tinting strength, and the shear strength uniformity of Example 2 were measured as 103, 104 and 101. The fact that the values for Example 2 are greater than those for Example 1 show that Example 2 gave higher tinting strength, which is desired in a white pigment.

The spread rate for Example 1 was measured as described above and found to be 308.4 square feet per gallon. The spread rate for Example 2 was measured to be 337.0 square feet per gallon, an increase in scattering efficiency of nearly 10%.

What is claimed is:

1. A method for forming a coating composition comprising the steps of:
    (a) forming a slurry comprising porous silica treated inorganic core particle and water by a process comprising:
        (1) providing a slurry of inorganic core particle in water;
        (2) heating the slurry to about 30 to about 40° C. and adjusting the pH to about 3.5 to about 7.5;
        (3) adding a soluble silicate solution to the slurry while maintaining the pH between about 3.5 and about 7.5; and
        (4) stirring for at least about 5 mins; and
    (b) heating the slurry comprising porous silica treated inorganic core particle and water at a temperature of at least about 90° C.; and
    (c) adding a soluble alumina source to the slurry from step (b) while maintaining the pH at about 8.0 to 9.5 to form an alumina treatment on the porous silica treated inorganic core particle;
    wherein the treated inorganic core particle does not comprise dense silica or alumina treatments, and has silica present in the amount of about 7% to about 14% by weight and alumina present in the amount of about 4.0% to about 8.0% by weight, wherein the weight percents are based on the total weight of the inorganic core particle; and wherein the particle to particle surface treatments are substantially homogeneous.

2. The method of claim 1 wherein the coating composition further comprises a resin.

3. The method of claim 2 wherein the resin is an acrylic, styrene-acrylic, vinyl-acrylic, ethylene-vinyl acetate, vinyl acetate, alkyd, vinyl chloride, styrene-butadiene, vinyl versatate, vinyl acetate-maleate, or a mixture thereof.

4. The method of claim 3 wherein the alkyd resin is a complex branched or cross-linked polyester having unsaturated aliphatic acid residues.

5. The method of claim 2 wherein the resin is a urethane resin.

6. The method of claim 5 wherein the urethane resin comprises the reaction product of a polyisocyanate and a polyhydric alcohol ester of drying oil acids.

7. The method of claim 6 wherein the polyisocyanate is a toluene diisocyanate.

8. The method of claim 2 wherein the resin is present in the amount of about 5 to about 40% by weight, based on the total weight of the coating composition.

9. The method of claim 1 wherein the inorganic core particle is an oxide of titanium, aluminum, zinc, copper or iron; a sulfate of calcium, strontium or barium; zinc sulfide; copper sulfide, zeolite; mica; talc; kaolin, mullite, calcium carbonate, or silica.

10. The method of claim 9, wherein the inorganic core particle is titanium dioxide or barium sulfate.

11. The method of claim 10 wherein the inorganic core particle is titanium dioxide.

12. The method of claim 1 wherein the slurry in step (b) is heated to a temperature of about 93 to about 97° C.

13. The method of claim 1 wherein the soluble alumina source is an alkali metal salt of an aluminate anion.

14. The method of claim 13 wherein the soluble alumina source is sodium aluminate or potassium aluminate.

15. The method of claim 1 wherein the treated inorganic core particle is completely dispersed in the water to form a slurry in less than 10 minutes.

16. The method of claim 1 wherein the silica in the porous silica treated inorganic core particle is applied by deposition of pyrogenic silica onto pyrogenic inorganic core particle, or by co-oxygenation of silicon tetrachloride with titanium tetrachloride.

17. The method of claim 1 wherein the slurry from step (a)(2) is heated to a temperature of about 33 to about 37° C.

18. The method of claim 17 wherein the soluble silicate is sodium silicate or potassium silicate.

* * * * *

UNITED STATES PATENT AND TRADEMARK OFFICE
CERTIFICATE OF CORRECTION

PATENT NO. : 9,539,557 B2
APPLICATION NO. : 14/354378
DATED : January 10, 2017
INVENTOR(S) : Michael Patrick Diebold et al.

Page 1 of 1

It is certified that error appears in the above-identified patent and that said Letters Patent is hereby corrected as shown below:

In the Specification

At Column 1 Line 61: "… dispersed in water to formic a slurry …" It should read "… dispersed in water to form a slurry …"

At Column 8 Line 5: "… a Katy mill …" It should read "… a Kady mill …"

At Column 8 Line 50: "… determined by comparing the KiS values …" It should read "… determined by comparing the K/S values …"

At Column 8 Line 51: "… drawdown to the KIS values …" It should read "… drawdown to the K/S values …"

Signed and Sealed this
Twenty-eighth Day of November, 2017

Joseph Matal
*Performing the Functions and Duties of the
Under Secretary of Commerce for Intellectual Property and
Director of the United States Patent and Trademark Office*